Figure 1:
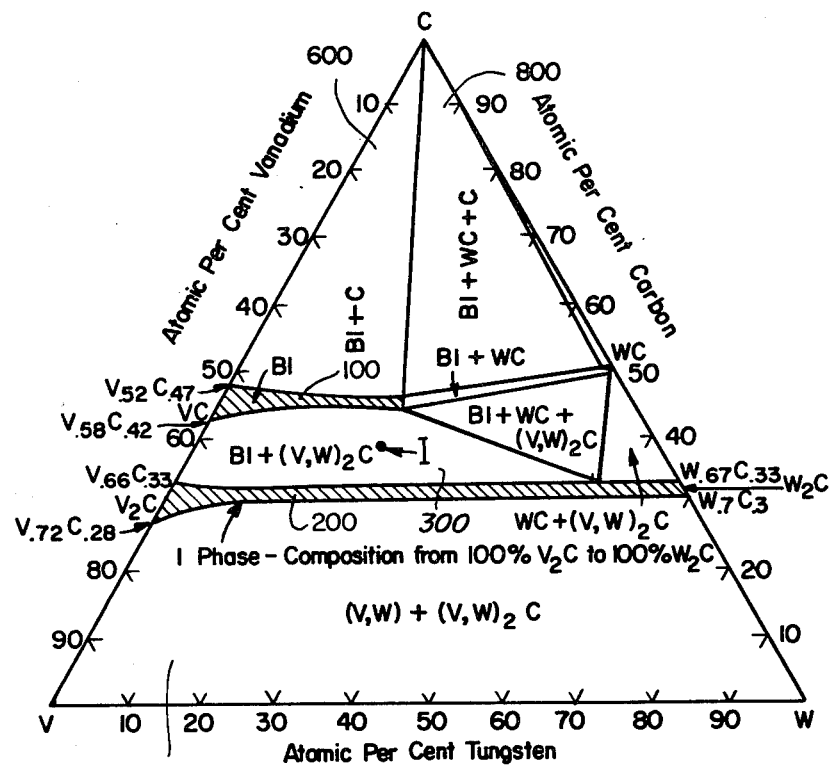

United States Patent [19]

Brown et al.

[11] 4,312,894
[45] Jan. 26, 1982

[54] HARD FACING OF METAL SUBSTRATES

[75] Inventors: Harry J. Brown, Lewiston, N.Y.; William D. Forgeng, Las Vegas, Nev.; Charles M. Brown, Lewiston, N.Y.

[73] Assignee: Union Carbide Corporation, New York, N.Y.

[21] Appl. No.: 159,447

[22] Filed: Jun. 13, 1980

Related U.S. Application Data

[60] Division of Ser. No. 885,943, Mar. 13, 1978, abandoned, which is a continuation of Ser. No. 698,848, Jun. 23, 1976, abandoned, which is a continuation of Ser. No. 472,048, May 21, 1974, abandoned.

[51] Int. Cl.³ .............................................. C22C 29/00
[52] U.S. Cl. ........................................ 427/34; 75/203; 75/239; 219/146.51; 219/137 WM; 219/76.14; 427/59; 427/61; 427/190; 427/319; 427/423
[58] Field of Search ................... 427/34, 59, 61, 190, 427/319, 423; 75/203, 239; 219/146.51, 137 WM, 76.14

[56] References Cited

U.S. PATENT DOCUMENTS

| | | | |
|---|---|---|---|
| 1,973,428 | 9/1934 | Comstock | 75/1 |
| 1,977,361 | 10/1934 | Taylor et al. | 219/8 |
| 2,133,867 | 10/1938 | Lucas | 75/136 |
| 2,170,433 | 8/1939 | Schwarskopf | 75/137 |
| 2,253,969 | 8/1941 | DaWihl et al. | 308/242 |
| 2,349,052 | 5/1944 | Ollier | 75/136 |
| 2,507,195 | 2/1948 | Colbeck et al. | 219/8 |
| 2,607,676 | 8/1952 | Kurtz | 75/136 |
| 3,004,873 | 10/1961 | Strohmeier et al. | 117/204 |
| 3,023,130 | 2/1962 | Wasserman et al. | 428/367 |
| 3,071,489 | 1/1963 | Pelton et al. | 427/201 |
| 3,109,917 | 11/1963 | Schmidt et al. | 219/76 |
| 3,165,822 | 1/1965 | Beeghly | 29/182.7 |
| 3,252,828 | 5/1966 | Quaas | 219/146.51 |
| 3,539,307 | 11/1970 | Baumel | 29/182.8 |
| 3,617,358 | 11/1971 | Dietrich | 427/423 |
| 3,790,353 | 2/1974 | Jackson et al. | 51/309 |
| 3,800,891 | 4/1974 | White et al. | 175/374 |
| 3,859,057 | 1/1975 | Stoll et al. | 75/242 |
| 3,869,319 | 3/1975 | Ishihara et al. | 148/31.5 |

FOREIGN PATENT DOCUMENTS

| | | |
|---|---|---|
| 418453 | 2/1968 | Australia . |
| 2149772 | 9/1972 | Fed. Rep. of Germany . |
| 504926 | 3/1971 | Switzerland . |

OTHER PUBLICATIONS

Highveld Vanadium News #3 (1974).
Gurevich et al., "X-Ray Study of the System Vanadium Carbide (VC)-Tungsten Carbide (WC)" [Translated from *Metallovedenie i Obrabotka Metallov*, Jan. 1958, #1, pp. 7-10.

Primary Examiner—John D. Smith
Attorney, Agent, or Firm—John R. Doherty

[57] ABSTRACT

Method for hard-facing substrates is disclosed using a hard facing material consisting essentially of at least one vanadium carbide. In a particular embodiment of the invention tungsten is present in the hard facing material in solid solution with vanadium carbide.

5 Claims, 2 Drawing Figures

HARD FACING OF METAL SUBSTRATES

This application is a division of our prior U.S. application Ser. No. 885,943, filed Mar. 13, 1978, abandoned, which is a continuation of application Ser. No. 698,848, filed June 23, 1976, abandoned, which is a continuation of application Ser. No. 472,048, filed May 21, 1974, abandoned.

The present invention relates to the hard facing of substrates. More particularly, the present invention relates to the hard facing of substrates using as the hard-facing material a vanadium carbide-containing composition to provide improved wear and impact resistance.

Hard facing of substrates, e.g. metal surfaces*, is a common industrial practice, for example, cast particulate tungsten carbide ($W_2C$-WC) or cobalt bonded WC, usually encased in a steel tube, is deposited by hard facing techniques on iron base alloys in making wear resistant cutters, earth moving equipment and the like. It has been found, however, that due possibly to the inherently different physical properties of base metal and tungsten carbide, the hard facing material has a tendency to become unevenly distributed in the molten portion of the metal substrate and as a result, undesired variations in hardness can occur in the resulting solidified hard-faced surfaces.

*The Oxy-Acetylene Handbook, 11th Edition, Linde Air Products Division of Union Carbide Corporation, also Welding Handbook Third Edition, American Welding Society.

Also, during the deposition of both cast and cobalt-bonded tungsten carbide on iron and steel substrates, the molten iron in the substrate dissolves some of the tungsten carbide and upon cooling results in the precipitation of the mixed carbides $(FeW)_6C$ and $Fe_3W_3C$ according to the formula $3WC+9Fe\rightarrow Fe_3W_3C+2Fe_3C$, thus resulting in substantial depletion of the deposited tungsten into less wear resistant phase.

In instances where tungsten carbide is employed in hard facing, due to the high density of tungsten carbide, a relatively large weight of tungsten carbide is required for adequate hard facing.

It is accordingly an object of the present invention to provide a hard-facing method using vanadium carbide-containing material to produce a hard-faced surface having wear-resistant properties at least comparable to those provided by the use of conventional tungsten carbide.

Figure 2:
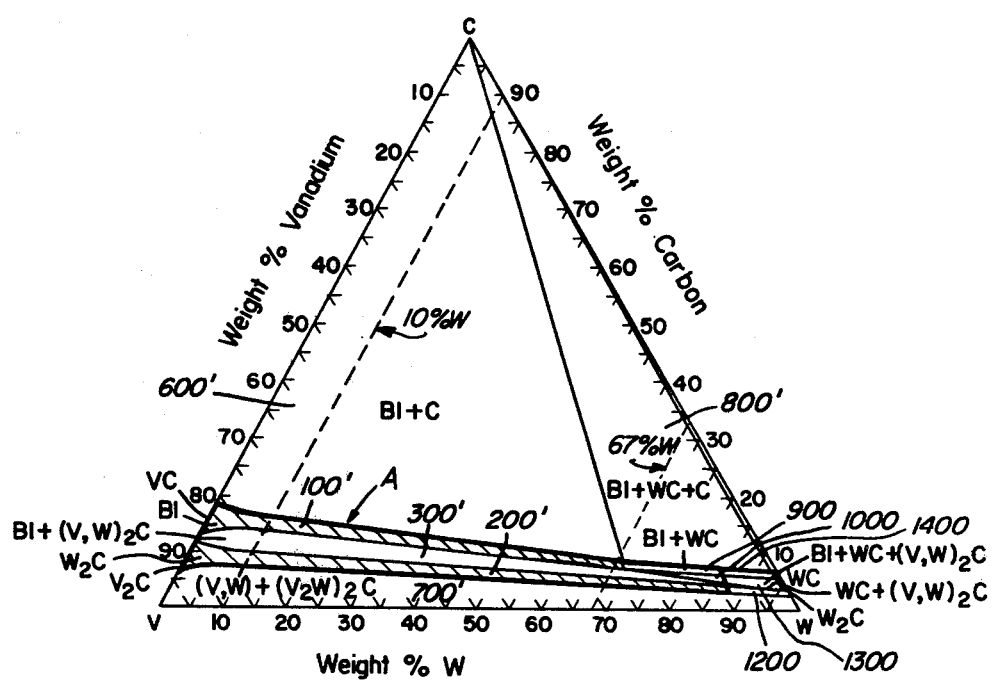

Other objects will be apparent from the following description and claims taken in conjunction with the drawing in which FIG. 1 illustrates a known phase diagram for vanadium, tungsten, carbon, and FIG. 2 shows the same phase diagram as FIG. 1 utilizing weight percent instead of atomic percent for defining vanadium-tungsten-carbon compositions.

The present invention is directed to an improvement in conventional methods of hard-facing substrates which comprises employing as the hard facing material a solid material consisting essentially of at least one vanadium carbide, and tungsten, when present, in solid solution with each vanadium carbide in said composition in an amount up to the solid solubility limit of tungsten in each such vandium carbide, the aggregate amount of vanadium carbides in said material being at least about 10% by weight, and cobalt being present in an amount to about 50% by weight of the aggregate vanadium, carbon and tungsten in said composition.

The aforementioned material can be formed of one of the vanadium carbides, or in the form of a mixture of two or more of such vanadium carbides, e.g. VC type, $V_2C$ type and intermediate carbides. When tungsten is present in the material, tungsten is in solid solution with the vanadium carbide or carbides in an amount ranging up to the solid solubility limit of tungsten in such carbide or carbides. By way of example, if the vanadium carbide in the material is entirely VC type, tungsten can be in solid solution with the VC in an amount up to about 25 atomic percent of the VC (region 100 in the Figure of the drawing) which is the solid solubility limit of tungsten in VC type carbide. Where the vanadium carbide in the material is entirely $V_2C$ type, tungsten has unlimited solubility (region 200 in the Figure of the drawing), however, the material in accordance with the present invention is required to contain a minimum amount of vanadium carbide as previously mentioned. By way of example, where a material is formed of both VC-type and $V_2C$-type carbides, such as indicated at I in the phase diagram of the drawing, the maximum amount of tungsten in solution would be about 63.5% by weight; in such material, of this percentage, about 23.7% would be in solid solution with VC-type carbide and about 39.8% would be in solid solution with $V_2C$ type carbide.

The foregoing solid solubility limit values for tungsten are and the composition of specific V-W-C materials for use in accordance with the present invention determinable from the phase diagram of FIG. 1 of the drawing which is based on the diagram appearing at the page of Binary & Ternary Phase Diagrams Supplement to DMIC Report 152, Feb. 7, 1963, Identification Code 195-2-63, which is incorporated herein by reference. The phase diagram at page 1397 of "Handbook of Lattice Spacings and Structure of Metals", W. B. Pearson—Vol. 2, Perrgammon Press 1967 Edition, can also be similarly employed and is also incorporated herein by reference.

In preparing a material such as indicated at I in FIG. 1, the percentages determinable from the phase diagram of the drawing for V, C, and W can be used as the percentages of these materials in a starting mixture containing elemental V, C and W. The mixture can thereafter be processed as hereinafter described. Alternatively, precombined vanadium and carbon and precombined tungsten and carbon, providing the same percentages in the starting mixture can also be used. Also, where the starting materials are oxides, e.g. $V_2O_3$, $WO_3$, additional carbon is provided in the starting mixture to reduce the oxides to metal, e.g. according to the general reaction:

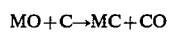

In general, the starting mixture constituents can vary within about 5% by weight of the aim values, an additional amount, e.g. up to 5% by weight, carbon being provided when considered important to ensure removal of incidental oxygen combined with the vanadium and/or tungsten constituents of the starting material. For particular processing apparatus and conditions, appropriate specific starting material proportions can be routinely determined.

As noted hereunder, when more than one vanadium carbide type is present in the material, the tungsten can be in solid solution in each of the vanadium carbides in an amount up to the solid solubility limit of the respective vanadium carbides, reference being taken of the requirement that the material employed in the present invention has at least a defined minimum amount of vanadium carbide. Tungsten present in the material above the solubility limit or limits will combine with carbon to form tungsten carbide, sufficient carbon being used in the preparation of the material to ensure that the material is substantially free, i.e. not more than 5% by weight, of elemental tungsten. Iron, nickel and cobalt can be present in the above mentioned material in an amount customarily used in the preparation of cemented carbides and higher, e.g. up to about 50% by weight in the aggregate, and preferably in the range of 0 to 18%.

The hard facing material of the present invention can alternatively be described as a composition consisting essentially of chemically combined vanadium and carbon and tungsten, where present, in solid solution with said chemically combined vanadium and carbon in an amount of from 0% by weight of the composition up to the solid solubility limit of tungsten in said chemically combined vanadium and carbon, and up to about 50% by weight in the aggregate of cobalt, nickel and iron, said chemically combined vanadium and carbon being in an amount of at least 10% by weight of said composition.

The above described hard facing material for use in the method of the present invention can also adventitiously contain a relatively small amount, e.g. up to about 5% by weight in the aggregate of incidental materials such as free carbon, vanadium and tungsten.

While any known technique can be used for producing the above described hard facing material from conventional starting materials, including elemental vanadium, tungsten and carbon, and vanadium and tungsten oxides, the preferred form of the hard facing material for use in the method of the present invention is a particulated cold pressed and sintered material illustrated by examples in the present specification. In these examples, the starting vanadium, carbon, tungsten and cobalt materials are blended, compacted and sintered under a hydrogen atmosphere at elevated temperatures, e.g. about 1200°–1600° C. and for periods, e.g. ½ to 3 hours, sufficient to product materials as aforedescribed.

A particular embodiment of the present invention comprises a hard facing rod in conventional form for use in hard facing metal substrates, e.g. iron, steel, cobalt, nickel, aluminum, copper, magnesium and alloys of such metals. Such a hard facing rod comprises a metallic sheath or tube formed of the usual metals for such purpose such as iron, steel, aluminum, copper and the like containing therein a hard facing composition as previously described.

The hard facing method of the present invention can be used with known gas and electric welding techniques, e.g. gas welding, arc welding and other practices described in the "Master Chart of Welding Processes"-American Welding Society (1969), using conventional fluxes. In the resulting hard faced articles substantially all, 80% by weight or more, of the applied vanadium carbide material and any dissolved tungsten is present in this form, i.e. vanadium carbide containing tungsten in solid solution. That is to say there is only a relatively slight, 5–20%, dissolution, i.e. depletion of the vanadium carbide or its dissolved tungsten into the surface metal.

The hard facing method of the present invention can also be used with known plasma flame spraying or coating techniques ("Flame Spray Handbook" Volume III-METCO INC. (1965).

In the hard facing of metal substrates in accordance with the present invention by the above-noted conventional techniques the metal substrate and the applied hard facing material become metallurgically bonded.

In a further embodiment of the present invention, the herein described hard-facing material is bonded to nonmetallic substrates using conventional adhesives such as natural or synthetic rubber-like or resinous materials, e.g. thermosetting materials such as phenolics, polyesters, crosslinked styrenated polyesters, thermoplastic materials such as polysulfones, epoxys, and cross-linked elastomeric materials, e.g. natural or synthetic rubbers.

With reference to FIG. 2 of the drawing, which has been prepared for purposes of convenience by converting the atomic weight percent scales of FIG. 1 to weight percent, vanadium-tungsten-carbon material for use in the present invention at least 95% by weight of which is in the form of vanadium carbide, and tungsten, when present in solid solution, and containing at least about 10% of a vanadium carbide is found in the region designated. A comprising regions 100′, 200′, 300′, 900 and 1000. A particularly preferred material is that defined by region 100′ wherein tungsten, when present, is in solid solution with VC type carbide. In region 200′, tungsten when present, is in solid solution with $V_2C$ type carbide and in region 300′ tungsten, when present, is in solid solution with VC and/or $V_2C$ type carbides. Compositions somewhat outside of region A are also suitable for use in the practice of the present invention. For example, a composition in region 600′, slightly above region 100′, would contain uncombined carbon and provided that this uncombined carbon does not exceed about 5% by weight of the material, is suitable for the practice of the present invention. Similarly, compositions of regions 700′, 800′, 900′ or 1000, 1200, 1300 and 1400 containing not more than about 5% by weight uncombined, C, WC, W and/or V are suitable for use in the practice of the present invention.

A V-W-C composition found to be particularly advantageous for use in accordance with the present invention contains from about 10 to 67 percent by weight tungsten in solid solution.

The following examples illustrate materials for use as hard-facing compositions in accordance with the present invention.

EXAMPLE I

The following materials were used to obtain a cold pressed sintered hard-facing composition of VC type material having about 50–60 weight percent tungsten in solid solution and containing about 6% by weight cobalt for use in the process of the present invention:

(a) 1978.4 g of a commercially available material (Union Carbide Corporation) containing mixed $V_2C+VC$, sized 65 mesh and finer having the following analysis:
  82.26% V
  14.24% C
  0.70% O
  0.50% Fe
  Balance moisture and incidental impurities.

(b) 1412.0 g UCAR* tungsten powder, deagglomerated, F.S.S.-2.0 microns.

(c) 192.0 g Acheson* brand G39 graphite powder, sized finer than 100 mesh.

(d) 242.4 g cobalt powder, extra fine grade from African Metals Corp.
*Trademark of Union Carbide Corporation.

The powders were placed in a ball mill (8-in. diameter×11 in. high, 48.4 lb. of ½-in. dia. balls) and turned at 52 RPM for 48 hours. After forty-eight hours milling, the material was cold pressed by pelletizing in a 1½-in. dis. die at about 38,000 psi. The compacts (apparent density ~5.14 gr/cc) were crushed in a pulverized and sized to 12×20 mesh. The resulting granules were placed in graphite boats and sintered in a pure hydrogen push through molybdenum-wound heat-treating furnace. The sintering cycle was as follows: The graphite boat was placed inside the furnace door for ½ hour, to diffuse out residual atmospheric gases. The boat then was advanced to a 900°–1200° C. zone to allow the reduction of any residual oxides and the removal of the reduction products. Then the boat was advanced into the hot zone at 1400° C. for 1½ hr. to provide sintering of the cold pressed material. The boat was then pushed out of the hot zone into a water-cooled chamber and brought to room temperature in 12 minutes. The granules were lightly bonded together but were easily separated in a jaw crusher. Aside from the contained cobalt, at least about 95% by weight of the material was formed of chemically combined vanadium and carbon having tungsten in solid solution.

The cold pressed and sintered material as prepared in the foregoing example was sized 12×32 mesh in a jaw crusher and employed as a hard-facing material in the following manner.

The granules were packed into a 12-in. length of ¼-in. O.D. by nominal 0.190-in. I.D. mild steel tubing. The granules composed about 45% by weight of the rod. The rod then was deposited on a plain carbon mild steel substrates using an oxy-acetylene torch. The flame was acetylene-rich to prevent decarburization. At the starting point, the metal substrate was brought to sweating temperature, i.e. the surface was brought to the melting point, and the rod deposited with a minimum of penetration of the substrate. The melted metal casing bonded the granules to the substrate and a metallurgical bond was formed between the hard facing material and substrate upon solidification of the molten metal.

The resulting hard-faced surface was found to be at least comparable in wear resistance to that obtained using cast tungsten carbide as the hard-facing material.

A particular advantage of using the above-described material in hard-facing practices is that the amount of vanadium carbide can be varied from essentially 100% in the form of combined vanadium and carbon to a material containing up to 90% by weight WC while providing excellent wear resistance, impact resistance, and hardness at least comparable to conventional tungsten carbide. Thus the ratio of combined vanadium and carbon, and tungsten can be varied to adjust the density of the material so as to be substantially the same as the density of the fused portion of the metal substrate to be hard faced. Consequently, even with light metal substrates such as aluminum, the density of hard-facing material in accordance with the present invention will not have to be more than about 50% greater than the molten surface. As a result, a uniform distribution of the hard-facing material in the melted portion of the substrate is greatly facilitated. Alternatively, the density of the hard-facing material can be readily adjusted, if desired, so that more hard-facing material will be in the lower portion of the melted substrate and vice versa.

A further advantage of the present invention is that in using vanadium carbide material, in place of tungsten carbide, as a hard facing material, the weight of the hard facing material used in a given application can be reduced by as much as 65% as compared to conventional cast tungsten carbide.

The following Table I shows various density values for exemplary materials in accordance with the practice of the present invention having the empirical compositions. The measured density for cast tungsten carbide is also shown in the Table.

TABLE I

| Empirical Composition | Density | Composition | Measured Density |
|---|---|---|---|
| 100% VC | 5.77 g/cc (calculated) | | |
| 75% VC + 25% WC | 6.87 g/cc (calculated) | Cast $W_2C$-WC | 16.28 g/cc |
| 60% VC + 40% WC | 7.88 g/cc (calculated) | | |
| (60VC + 40WC)+3% Co | 6.97 g/cc (measured) | | |

EXAMPLE II

A mixture of mixed VC+$V_2$C material, elemental tungsten, and graphite was prepared to obtain a cold pressed and sintered hard facing composition of VC type material having about 50–60% by weight tungsten in solid solution for use in the method of the present invention. The tungsten was UCAR* tungsten powder having an average particle size 2.5 microns; the vanadium carbide material (commercially available from Union Carbide Corp.) was sized 65 mesh and finer; the graphite was Acheson* G39 powder, sized 200 mesh and finer. The amounts of W, vanadium carbide material and graphite in the mixture were:
(a) Tungsten 759.95 g
(b) Mixed VC+$V_2$C 1130.4 g
   85.90% V
   12.53% C
   0.86%
   0.50% Fe
   Balance moisture and incidental impurities
(c) Graphite 136.4 g
*Trademark of Union Carbide Corporation.

The above constituents were charged to a stainless steel ball-mill, 5¾-in. high having an inner diameter of 6 in. The milling media was 8100 g of steel ½-in. diameter balls. The mill was turned at 76 RPM for a total milling time of 100 hr. The blended mixture was cold pressed into compacts at 38,000 psi. The compacts had dimensions of 1¼ inch diameter by 1 inch thick. Density of the cold pressed material was 5.028 g/cc. The cold pressed material was granulated to 40×200 mesh by crushing and screening. The resulting granules were placed in graphite boats and furnaced in pure hydrogen in a molybdenum element push-through furnace. The boats were introduced into a 900°–1200° C. zone and held there for ½ hr. to cause reduction of any incidental metal oxides. After this the boat was pushed into the hot zone and sintered at 1400° C. for 1.5 hours. The boat was then pushed into a water-cooled chamber and brought to room temperature in about 12 minutes. The granules were easily separated into a size of 48 to 250 mesh by passing through a jaw crusher. At least 95% by weight of the material was formed of chemically combined vanadium and carbon having tungsten in solid solution. The apparent density of the sintered cold pressed material was 6.45 g/cc.

EXAMPLE III

A mixture of mixed $VC+V_2C$ material, elemental tungsten, elemental cobalt and graphite was prepared to obtain a cold pressed and sintered hard facing composition of VC type material having about 50–60 weight percent tungsten in solid solution and containing about 1% by weight cobalt. The tungsten was UCAR* tungsten powder having an average particle size of 2.5 microns. The vanadium carbide material was sized 63 mesh and finer (commercially available from Union Carbide Corporation). The cobalt powder was extra fine grade from African Metals Corporation having an average particle size of 1.31 microns. The graphite was Acheson* G39 powder (available from Union Carbide Corporation), sized 200 mesh and finer. The amounts of W, Co and graphite in the mixture were as follows:
 (a) Tungsten 750.96 g
 (b) Mixed $VC+V_2C$ 1130.4 g
  85.90% V
  12.53% C
  0.50% Fe
  0.86% O
  Balance moisture and incidental impurities
 (c) Graphite 136.4 g
 (d) Cobalt 20.2 g
Trademark of Union Carbide Corporation The above constituents were charged to a stainless steel ball-mill, 5¾ in. high having an inner diameter of 6 inches. The milling media was 8100 g of steel ½-in. diameter balls. The mill was turned at 76 RPM for a total milling time of 100 hrs. The blended mixture was cold pressed by roll compacting into sheet. A bar pressed at 31.200 psi from the sheet had a green density of 5.323 g/cc. The cold compacted sheet material was granulated to 10×28 mesh and the granules were placed in a graphite boat and furnaced in pure hydrogen in a molybdenum element push-through furnace. The boats were introduced into a 200° C. zone and held there for ½ hr. to eliminate air and moisture. The boats were advanced into a 900°–1100° C. zone and held there for ½ hr. to cause reduction of any incidental metal oxides. After this the boat was placed in the hot zone and the material sintered at 1400° C. for 1.5 hr. The boat then was pushed into a water-cooled chamber and brought to room temperature in about 12 minutes. The granules were easily separated by passing through a jaw crusher and sized 12 to 30 mesh. Aside from the contained cobalt at least 95% by weight of the material was formed of chemically combined vanadium and carbon having tungsten in solid solution. The apparent density of the sintered cold compacted material was 6.4 g/cc.

EXAMPLE IV

A mixture of mixed $VC+V_2C$ material, elemental cobalt and graphite was prepared to obtain a cold pressed and sintered hard facing composition having an empirical composition of $VC+3\%Co$ for use in the process of the present invention. The vanadium carbide material was sized 65 mesh and finer (commercially available from Union Carbide Corporation). The cobalt powder was extra fine grade from African Metals Corporation having an average particle size of 1.31 microns; the graphite was Acheson* G39 powder, sized 200 mesh and finer. The proportions were such as to produce a final product containing vanadium, carbon and cobalt in the empirical relationship of $VC+3\%Co$. The amounts of vanadium carbide material, cobalt and graphite in the mixture were as follows:
 (a) Mixed $VC+V_2C$ 10 lbs.
  85.90% V
  12.53% C
  0.86% O
  0.50% Fe
  Balance moisture and incidental impurities
 (b) Co 0.330 lb.
 (c) Graphite 0.836 Lb.
*Trademark of Union Carbide Corporation The above constituents were charged to a stainless steel ball 5¾ in. high having an inner diameter of 6 inches. The milling media was 6000 grams of steel ½-in. diameter balls. The mill was turned at 76 RPM. Milling was continued for a total milling time of 48 hours. The green density of the compacts cold pressed from the mixture at 38,000 psi was measured at 3,678 grams/cc. The blended mix was cold pressed by roll compacting into sheet and granulated to 10×28 mesh. The granules were placed in a graphite boat and furnaced in pure hydrogen in a molybdenum element push-through sintering furnace. The boats were introduced into a 200° C. zone and held there for ½ hr. to eliminate air and moisture. The boats then were advanced into a 900°–1100° C. zone and held there for ½ hr. to cause reduction of any incidental metal oxides. After this the boats were pushed into the 1300° C. zone for 1½ hours to sinter the cold compacted material. The sintered material was then pushed into a water-cooled chamber and cooled to room temperature in about 12 minutes. The granules were easily separated by passing through a jaw crusher and sized to 12×30 mesh. At least 95% by weight of the material was in the form of vanadium monocarbide (VC).

EXAMPLE V

A mixture of $V_2O_3$, elemental cobalt and graphite was prepared. The $V_2O_3$, had an average particle size of 200 mesh and finer; the cobalt powder was extra fine grade from African Metals Corporation, having an average particle size of 1.31 microns; the graphite was Acheson* G39. The proportions were such as to produce a cold pressed and sintered hard facing composition final product having an empirical composition of VC-3Co for use in the method of the present invention. The amounts of $V_2O_3$, cobalt and graphite in the mixture were as follows:
 (a) $V_2O_3$ 1814.4 g
 (b) Co 46.6 g
 (c) Graphite 723.0 g
*Trademark of Union Carbide Corporation The $V_2O_3$, cobalt and graphite constituents were charged to a stainless steel ball mill, 8.0-in. high having an inner diameter of 9.75 in. The milling media was 15.5 lb. of tungsten ½-in. dia. balls. The mill was turned at 65 RPM. The mix was ball milled for 16 hrs. The milled mix was roll compacted to sheet (density 2.428 grams/cc) and granulated to 8×12 mesh. The granules were packed in graphite boats and furnaced in pure hydrogen in a platinum-wound tube furnace. The boats were heated to 1150° C. and held for 2 hrs. in flowing hydrogen. The temperature was increased to to 1300° C. and held for 2.5 hrs. The granules were easily separated by passing through a jaw crusher and sized to 12×30 mesh. The material was in the form of vanadium monocarbide, VC type, present as somewhat spherical crystals in a relatively soft cobalt matrix and contained in addition to combined vanadium and carbon, 2.73% free carbon.

EXAMPLE VI

A mixture of mixed VC+V$_2$C (commercially available from Union Carbide Corporation) material, elemental iron and graphite was prepared to obtain a cold pressed and sintered hard facing composition having an empirical composition of VC+2%Fe. The amounts of vanadium carbide material, iron and graphite in the mixture were as follows:

(a) Mixed VC+V$_2$C 200 g.
   83.66% V
   14.14% C
   0.88% O
   Balance moisture and incidental impurities
(b) Fe 4.27 g.
(c) Graphite 12.48 g.

The above constituents were placed in a 2-qt. ball mill together with 10.25 lb. of ½-in. diameter steel balls. The mill was turned for 16 hrs. at 105 RPM. The powder was removed, roll-compacted and granulated to 10×28 mesh with a bulk density of 31.80 g/in.$^3$. The granules were placed in a graphite boat and sintered in pure hydrogen in a molybdenum element push through furnace for 1.5 hrs. at 1300° C. The sintered material was then pushed into a water-cooling chamber and brought to room temperature in about 12 min. The sintered granules were lightly bonded but easily broken down in a jaw crusher. The bulk density of the sintered granules, sized 12×32 mesh was 42.91 g/in.$^3$. The vanadium and carbon in the cold pressed and sintered material were combined in the form of monocarbide (VC).

EXAMPLE VII

A mixture of V$_2$O$_3$, WO$_3$, elemental cobalt and graphite was prepared to obtain a cold pressed and sintered hard facing composition of VC type material having about 20-25 weight percent tungsten in solid solution and containing about 13.5% by weight cobalt for use in the method of the present invention. The V$_2$O$_3$ had an average particle size of 200 M×D; the WO$_3$ had an average particle size of 100 mesh and finer; the cobalt powder was extra fine grade from African Metals Corporation, having an average particle size of 1.31 microns; the graphite was Acheson* G39 powder, sized 200 mesh and finer. The amounts of V$_2$O$_3$, WO$_3$ cobalt and graphite in the mixture were as follows:

(a) V$_2$O$_3$ 299.80 g
(b) WO$_3$ 96.0 g
(c) Co 53.0 g
(d) Graphite 137.85 g

*Trademark of Union Carbide Corporation.

The V$_2$O$_3$, WO$_3$ cobalt and graphite constituents were charged to a 2 quart mill. The milling media was 6.25 lb. of steel ½ inch diameter balls. The mill was turned at 95 RPM. The mix was ball milled for 24 hrs. The milled mix was cold pressed by roll compacting to pellets 1″ dia. by ½″ thick (density 3.04 grams/cc). The pellets were packed in graphite boats and furnaced in pure hydrogen in a platinum-wound tube furnace. The boats were heated to 1000° C. and held for 4 hrs. in flowing hydrogen. The temperature was increased to 1400° C. and held for 2 hrs. The sintered pellets were crushed to 32×48 mesh. The resulting material had an apparent density of 5.82 g/cc and a bulk density of 44.5 g/in.$^3$. The tungsten, vanadium and carbon in the material were in the form of a solid solution of W in VC and the material contained 13.5% Co.

EXAMPLE VIII

The following materials were used to obtain a cold pressed sintered hard-facing composition of VC type material having about 20-25 weight percent tungsten in solid solution and containing about 3% by weight cobalt for use in the process of the present invention:

(a) 69.152 lbs. of a commercially available material (Union Carbide Corporation) containing mixed V$_2$C+VC, sized 65 mesh and finer having the following analysis:
   84.69% V
   13.20% C
   1.10% O
   0.30% Fe
   Balance—moisture and incidental impurities.
(b) 22.763 lbs. UCAR* tungsten powder, deagglomerated, F.S.S.-2.0 microns.
(c) 5.422 lbs. Acheson* brand G39 graphite powder, sized finer than 100 mesh.
(d) 3 lbs. cobalt powder, extra fine grade from African Metals Corp.

*Trademark of Union Carbide Corporation

The powders were placed in a 2 cubic foot ball mill with 500 lbs. of ½ in. diameter steel balls, and turned at 36 RPM for 48 hours. After forty-eight hours milling, a portion of the material was cold pressed at about 38,000 psi; the cold pressed material had a density of 4.219 gr/cc. The material was roll compacted to sheet and crushed and sized in a pulverizer to 10×20 mesh. The apparent density was ~5.14 gr/cc. The resulting granules were placed in graphite boats and sintered in a pure hydrogen push through molybdenum-wound heat-treating furnace. The sintering cycle was as follows: The graphite boat was placed inside the furnace door for ½ hour, to diffuse out residual atmospheric gases. The boat then was advanced to a 900°-1200° C. zone to allow the reduction of any residual oxides and the removal of the reduction products. Then the boat was advanced into the hot zone at 1550° C. for 1½ hrs. to provide sintering of the cold pressed material. The boat was then pushed out of the hot zone into a water-cooled chamber and brought to room temperature in 12 minutes. The granules were lightly bonded together but were easily separated in a jaw crusher. Aside from the contained cobalt, at least about 95% by weight of the material was formed of chemically combined vanadium and carbon having tungsten in solid solution.

The material prepared in the foregoing example was sized 12×32 mesh in a jaw crusher for use as a hard-facing material.

The chemical analysis by weight of the material was as follows:
   13.40% C
   56.24% V
   23.55% W
   3.46% Co
   1.26% Fe*
   0.10% O

*increase in iron content from grinding equipment used.

Considering only the V, C and W constituents the percentages are as follows:
   C 14.37% by weight, 47.46 Atomic %

W 25.27% by weight, 5.46 Atomic %
V 60.34% by weight, 47.06 Atomic %

In a particular embodiment of the present invention an additional amount of finely divided tungsten and carbon is used in the preparation of the hard facing material as a constituent of the starting material mixture, so that in addition to a solid solution of tungsten in one or more vanadium carbides, the hard facing material can also contain in an intimate sintered admixture therewith, up to 90% by weight of tungsten carbide. This material can be used in the hard facing method of the present invention to accomodate a desired density in the hard facing material which may be advantageous in hard facing particular metal substrates.

In another embodiment of the present invention, the hard facing material of the present invention contains up to 90% by weight chromium carbides. This is achieved by including chromium metal or chromium oxide together with additional carbon in the preparation of the hard facing material as a constituent of the starting material mixture, or by admixing chromium carbide with separately prepared hard facing material in accordance with the present invention as hereabove described.

The mesh sizes referred to herein are Tyler series.

What is claimed is:

1. In a method for hard facing iron and steel substrates by heating a surface of said substrate to its melting point, providing molten iron or steel thereon, applying particulate hard facing material to said molten iron or steel and forming a metallurgical bond between said metal surface and the applied hard-facing material upon solidification of the molten iron or steel, the improvement which comprises employing as the applied hard facing material a prealloyed finely divided particulate composition of chemically combined vanadium and carbon having tungsten in solid solution, said composition consisting essentially of (i) at least one vanadium carbide and (ii) tungsten in solid solution with each vanadium carbide in said composition in an amount from about 10% by weight up to an amount equal to the solid solubility limit of tungsten in each vanadium carbide in said composition, the aggregate amount of all vanadium carbides in said composition being at least about 10% by weight of said composition and about 5% to not more than about 20% by weight of the applied vanadium carbides being dissolved in said solidified molten metal, the remainder of said applied vanadium carbides being in the form of vanadium carbide containing tungsten in solid solution metallurgically bonded to said metal substrate and substantially uniformly distributed in said molten metal.

2. A method in accordance with claim 1 wherein said hard facing composition contains at least one material selected from the group of nickle, cobalt and iron in an amount up to about 50% by weight of said composition.

3. A method in accordance with claim 1 wherein said hard facing composition has a density substantially the same as said molten iron or steel.

4. A method in accordance with claim 1 wherein said hard facing composition contains up to about 67% by weight of tungsten in solid solution.

5. A method in accordance with claim 1 wherein said hard facing composition is a cold pressed and sintered solid material in particulated form.

* * * * *

UNITED STATES PATENT AND TRADEMARK OFFICE
CERTIFICATE OF CORRECTION

PATENT NO. : 4,312,894
DATED : January 26, 1982
INVENTOR(S) : Harry J. Brown, William D. Forgeng & Charles M. Brown It is certified that error appears in the above—identified patent and that said Letters Patent is hereby corrected as shown below:

Column 4, line 24 - the period (.) after "designated" should be deleted.

Column 7, line 14 - "63" should read "65".

Column 8, line 60 - "65" should read "64".

Signed and Sealed this

Thirteenth Day of April 1982

[SEAL]

Attest:

GERALD J. MOSSINGHOFF

Attesting Officer Commissioner of Patents and Trademarks